Sept. 29, 1959 G. E. HOEDINGHAUS ET AL 2,906,542
NESTING MARKET CART BASKET HAVING A LEVEL BOTTOM
Filed June 24, 1957 2 Sheets-Sheet 1
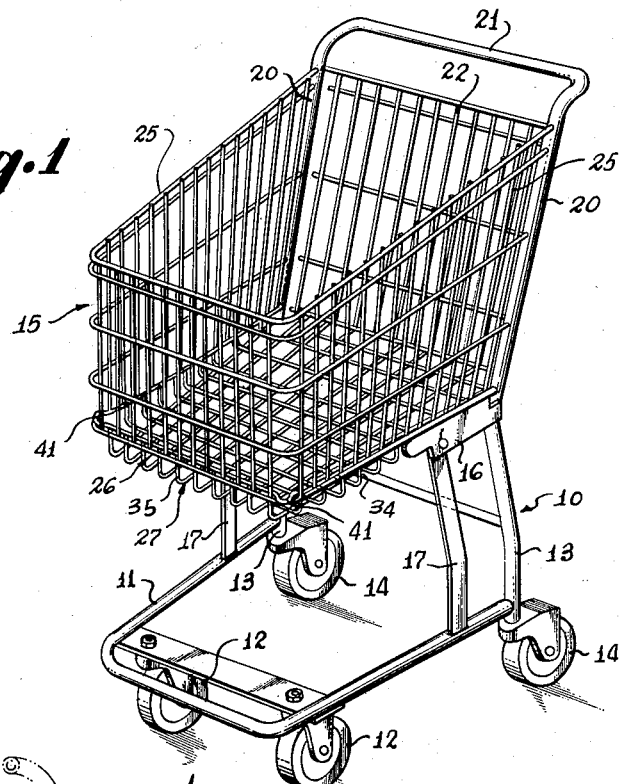
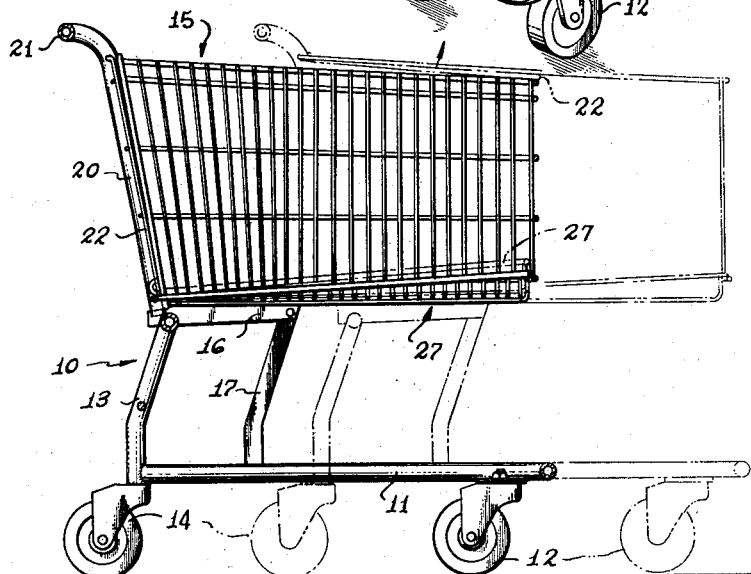
INVENTORS
GEORGE E. HOEDINGHAUS
RALPH G. SANDERS
BY
Attorneys Sept. 29, 1959 G. E. HOEDINGHAUS ET AL 2,906,542
NESTING MARKET CART BASKET HAVING A LEVEL BOTTOM
Filed June 24, 1957 2 Sheets-Sheet 2

INVENTORS
GEORGE E. HOEDINGHAUS
RALPH G. SANDERS
BY
*Gulwider Mattingly & Huntley*
Attorneys United States Patent Office 2,906,542
Patented Sept. 29, 1959

2,906,542

NESTING MARKET CART BASKET HAVING A LEVEL BOTTOM

George E. Hoedinghaus and Ralph G. Sanders, Burbank, Calif.

Application June 24, 1957, Serial No. 667,555

10 Claims. (Cl. 280—33.99)

This invention relates generally to market carts of the type used by customers in large grocery and similar markets, and more particularly to a telescopically nesting cart having an upper basket whose bottom is level.

As more and more grocery stores and markets adopt the self-service principle of operation, the need for carrying means or baskets in which the customers may place their purchases has correspondingly increased. To enable the customer to do her shopping with the greatest ease, baskets are generally mounted upon carts that may easily be pushed or wheeled from place to place within a store, and when the customer has completed her shopping, the carts are returned to a storage area for use by other customers. The space required for the storage of a large number of carts has resulted in the development of the telescopically nesting cart, of the general type shown in the patent to Watson, No. 2,479,530, issued August 16, 1949 and entitled "Store Basket and Carriage." However, for such carts to nest, the forward end of the bottom of the rear basket must be slightly above the rear end of the bottom of the forward basket, and consequently, the bottom wall or floor of these baskets must slope. While the amount of slope is not great, it is sufficient to prevent many objects from remaining upright unless they are supported by the rear wall of the basket or some other item. Many times the instability of an article placed upon the sloping floor of a basket has caused breakage or damage to the article itself or to other goods, and the general annoyance of a sloping floor is something to be eliminated if possible.

Consequently, it is a major object of the present invention to provide a telescopic market cart having a basket whose bottom or floor is level.

Another object of the invention is to provide such a cart in which the nesting features are not impaired, and which, in fact, can be nested with earlier carts, having a sloping floor.

It is a further object of the invention to provide such a construction that is sturdy and capable of withstanding the severe usage to which such carts are placed.

Still another object of the invention is to provide a basket construction that greatly simplifies the fabrication of the basket and permits the basket to be constructed in less time, and at a reduced cost.

It is a still further object of the invention to provide a cart and a basket therefore having the foregoing advantages and capable of carrying the same weight and quantity of materials as previous baskets.

These and other objects and advantages of the invention will become apparent from the following description of a preferred form thereof and from the drawings illustrating that form in which:

Figure 1 is a perspective view of a market cart having the improved basket;

Figure 2 is a longitudinal sectional view of the cart and basket, shown in Figure 1, together with a second cart, shown in phantom outline, in which the first cart is nested;

Figure 3:
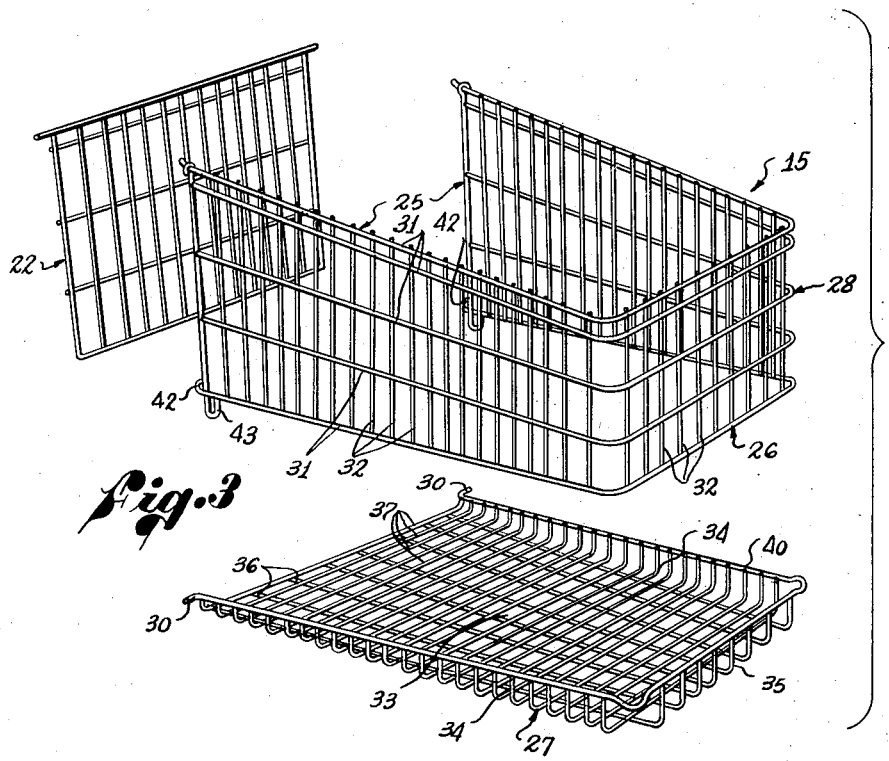
Figure 3 is an exploded perspective view of the various members going to make up the complete basket.
Figure 4:
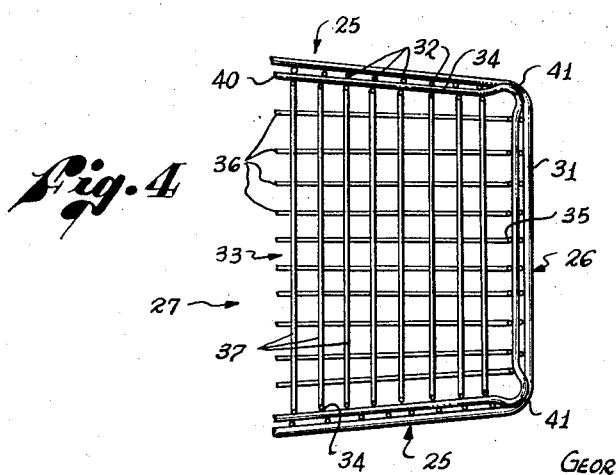
Figure 4 is a fragmentary plan view of the bottom of the basket, with a portion of the sides of the basket indicated to show the method of supporting the bottom.

Referring now to the drawings, the market cart constituting the present invention includes a frame 10 of any suitable construction, such as a frame formed of tubular members that provide the necessary strength, while having the desired characteristics of light weight. The frame includes a forwardly extending lower structure 11 having wheels or casters 12 at its forward end, and the rear end of the lower structure is connected to vertical members 13 having wheels or casters 14 at their lower ends. The vertical members 13 project upwardly to the lower portion of a basket 15, and are connected to side plates 16 that provide support for the basket in a manner hereinafter described. The forward ends of the side plates 16 are preferably braced and supported by vertical supports 17.

Extending upwardly from the side plates 16 along the rear end of the basket 15 are supporting members 20 that may be formed as a continuation of the vertical members 13, or as separate members. The supporting members 20 are joined at their upper ends to form a horizontal handle member 21 that is used in moving and guiding the cart. The framework 10 thus provided is essentially similar to many similar frameworks for market carts that have been known and used for a number of years. Generally, such frameworks include a lower shelf structure (not shown) connected to the forwardly projecting portion 11, and adapted to receive and carry additional items. Any suitable lower shelf structure may be used with the market cart of the present invention, or if desired, no shelf at all need be used. The shelf and the framework 10, do not, per se, form any part of the present invention except as the construction of the framework cooperates with and forms a part of the construction of the basket 15.

In accordance with the usual construction of telescoping market carts, the basket 15 is firmly supported at its rear end, while the front or forward end projects as a cantilever to permit its entrance into the rear end of a market cart into which it is to be nested. The rear end of the basket 15 is closed by a gate 22 that is pivotally supported at its upper end by the vertical supports 20, the gate extending between these supports and closing the space therebetween. Upon the nesting of two carts, the forward end of the basket of the rear cart engages the gate 22 to the forward cart and pivots it upwardly so that the basket of the rear cart may be slid into the basket of the forward cart. This form of construction is shown and described in the aforementioned Watson patent.

It will be appreciated that to permit this type of nesting of the carts, the baskets must be of a generally tapered construction so that the front end of the basket on the rear cart is smaller, and can fit into the rear end of the basket on the forward cart. Conventional construction has called for the side walls of the basket 15 to be forwardly converging, and the top and bottom of the basket to be similarly forwardly converging. For practical reasons and to permit symmetrical nesting of the carts, the side walls make substantially equal angles with the rear wall or gate 22, and the same requirements dictate that the bottom or floor of the basket be higher at the front end than at the rear end. It is this latter requirement that has resulted in the tipped or sloping floor of the basket. The disadvantages of the sloping floor are overcome in the present invention by providing a movable floor for the basket 15 which normally occupies a substantially horizontal position, but which may be tilted so that the front end of the floor is raised to fit within the basket of a cart that is nested with the first cart.

The construction of the basket 15 is best seen in Figure 3, where the previously mentioned rear wall or gate 22 is shown spaced from side walls 25 of the basket. As indicated, the rear wall or gate 22, the side walls 25, the front wall 26 and the bottom or floor 27 are preferably of a wire construction to provide the necessary strength and rigidity, without excessive weight. A perforated or solid sheet material, such as expanded metal, or other suitable materials, can be used instead of the wire construction, but the numerous advantages of wire construction make this form preferable for most applications.

As indicated in Figures 2 and 3, three walls of the basket 15, the side walls 25 and the end wall 26, form a sub-assembly 28 that is firmly supported by the frame 10 and is substantially immovable with respect thereto. The rear wall 22, as previously mentioned, is pivotally mounted at its upper end to the supporting members 20, and the bottom or floor 27 of the basket is pivotally mounted at its free end to the supporting members. As seen in Figure 3, the floor member 27 is provided with a pair of stub shafts 30 that fit into holes or other bearing means that may be located in the supporting members 20 or in the side plates 16, the stub shafts defining a generally horizontal axis about which the floor member may rotate. Movement of the floor member 27 is restrained by hereinafter described engaging means located at the forward end of the floor member, these engaging means limiting downward movement of the floor member to a position where the upper surface of the bottom or floor of the basket 15 is substantially horizontal. Upward movement of the forward end of the floor member 27 permits the forward end of the basket 15 to be inserted into the rear end of a corresponding basket of another cart, and further upward movement of the forward end of the floor member 27 permits the floor member to be swung to a substantially vertical position, thus opening the bottom of the basket.

Considering now the construction of the basket 15 in somewhat greater detail, the side walls 25 and the end wall 26 are preferably formed as a single unit or sub-assembly 28 having generally longitudinally extending rods or wire members 31 connected together throughout their length by generally vertically extending cross members 32 of suitable gauge wire or rod. The uppermost longitudinally extending member 31 slopes generally downwardly from the rear of the basket 15 to the forward wall 26, extends generally horizontally along that wall, and then slopes generally upwardly to the rear of the basket. Similarly, the lowermost longitudinally extending member 31 slopes generally upwardly from the rear of the basket 15, extends generally horizontally across the forward wall 26, and slopes generally downwardly to the rear of the basket. In this way, when the sub-assembly 28 is installed upon the frame 10, the upper and lower planes of the basket 15 are forwardly converging, the lower plane sloping upwardly, and the upper plane sloping downwardly.

The floor member 27 includes a floor or bottom portion 33 with upwardly extending side portions 34 and a generally upwardly extending front end portion 35. The floor portion 33 is formed of generally longitudinally extending rods or wire members 36 which are bent upwardly at their forward ends to form the end wall portion 35, and of generally transversely extending rod or wire members 37 that are bent upwardly on their ends to form the side portions 34.

The ends of the longitudinal members 36 that form the end wall 35 and the ends of the transversely extending members 37 that form the side walls 34 are connected to a tie rod 40 that forms what might be termed a ring frame. The ends of the tie rod 40 are, in this form of construction, bent outwardly to form the stub shafts 30, and at the corners formed by the intersection of the side walls 34 and the front wall 35, the tie rod is displaced outwardly and forwardly to form loops 41 or similar protuberances that extend beyond the boundaries of the walls.

The bottom member 27 is of a size to fit within the walls of the basket 15, the side portion 34 of the floor member 27 being just inward from the side walls 25 of the sub-assembly 28, and the end section 35 being just rearward of the end wall 26. The floor member 27 extends the full length of the side walls 25, and at the rear end of the side walls, the lowermost longitudinally extending member 31 is provided with a loop 42 through which the stub shafts 30 may pass on their way into the vertical supporting members 20. The loops 42 bear against the inner surfaces of the supporting members 20 and prevent the sides 25 from being spread outwardly, while similar loops 43, formed on the lower ends of the rearmost vertically extending members 32, engage the outer surfaces of the side plates 16 and prevent the sides 25 from being forced inwardly. Any distortion of the sides would, of course, affect the proper operation of the basket.

It will be noted that the generally vertically extending members 32 of the sub-assembly 28 are so spaced and positioned that an open space is left at the intersection of the front wall 26 with the side walls 25. When the floor member 27 is properly located within the sub-assembly 28, the protuberances 41 rest upon the lowermost longitudinally extending member 31 and thus prevent further downward movement of the floor member 27. In this position, the floor or bottom section of the floor member 27 is horizontal, or parallel to the surface on which the casters 12 and 14 rest. When a market cart using the improved basket is to be nested in the rear of another similar cart, the longitudinally extending members 35 of the floor member 27 are urged upwardly by the engagement of their curved portions with the rear end of the floor member 27 of the forward cart. Thus, as indicated in Figure 2, when a group of carts are telescopically nested, the bottom members 27 of all but the most forward cart are pivoted slightly upwardly, as indicated by the phantom outline of the bottom member 27.

In addition to providing a level floor or bottom for basket 15, the construction herein defined provides another advantage. In a number of markets, the clerk checking out the goods has a relatively free and unobstructed access to the contents of the basket 15. In addition, as previously mentioned, most market carts have a lower shelf structure on which additional items may be placed, but in many markets, the clerk's access to this lower shelf structure is at best limited, and occasionally very restricted. Under these conditions, the basket of the present invention offers the additional advantage that the floor member 27 may be swung upwardly about its stub shafts 30 to a generally vertical position, whereupon the clerk may reach through the basket to remove the items on the lower shelf.

In addition to the advantages secured in the use of the basket herein disclosed, other advantages accrue in the manufacture of these baskets. These advantages will become more apparent when it is recalled that each of the junctions of the various wires or rods, including the junctions of the longitudinally extending wires 31 with vertically extending wires 32, as well as the junctions of the longitudinally extending members 36 with the transversely extending members 37, must be securely anchored and held, as by spot welding. In the construction of a basket in which the floor or bottom is formed integrally with the sides and front end, the longitudinal and transversely extending members making up the bottom section are first placed in the desired positions and then individually spot welded, or spot welded in relatively small groups. If the wires and rods which project beyond the bottom or floor to form the sides and end, have not previously been bent into the necessary position, this bending is done after the welding of the bottom, leaving a number of generally vertically extending wires that go to form the side and end walls. To these vertically extending wires there are then attached generally horizontally extending members, similar to the members 31 previously described, and to perform this welding, special tools and jigs must be provided to reach into the basket so that all the necessary welds may be completed.

By means of the present invention, the bottom section 27 may be formed as a flat plate, with the various longitudinal and transversely extending members 36 and 37 being welded together, as previously described. Thereafter, the sides 34 and the end 35 are formed by bending up the ends of the wires 36 and 37, and the generally horizontal tie member 40 may easily be welded to the ends of those wires by using standard equipment that is readily available.

To form the sub-assembly 28, rods or wires corresponding to the longitudinally extending wires 31 may be laid in a jig and the generally vertically extending wires 32 laid on top of them. The entire set of rods and wires may be laid up in a flat or plane jig, and the spot welding may be accomplished by suitable high production means such as may be exemplified by various forms of so-called roll welders. Thereafter, the flat element that constitutes the sub-assembly 28 may be bent as indicated generally in Figure 3, which is a very simple operation. Welding in relatively inaccessible places, such as would be required if the bottom and sides were formed as a single unit, is thus eliminated. By performing substantially all of the operations on essentially flat members, jigs, tooling, and manufacturing processes may be greatly simplified with resultant savings in both cost and time.

It will be appreciated that the basket herein shown and described is adapted to be used with carts having many other features. Thus, if desired, the rear wall or gate 22 may have a child's seat incorporated in it, and similarly, the lower portion of the cart may have a shelf or basket thereon.

These and other modifications, in addition to those previously mentioned, will immediately become apparent to those skilled in the art, and consequently the invention is not to be limited to the particular form or arrangement of parts herein described and shown except as restricted by the following claims.

We claim:

1. A telescoping cart of the class described which includes: a frame having a lower structure adapted to telescopically nest within a frame of a similar cart; a supporting member at the rear of said frame; a basket structure connected to said supporting member and projecting forwardly therefrom, having side walls and a front wall; floor means mounted at the lower rear end of said basket structure for pivotal movement with respect to said side walls and cooperating with said basket structure to form a bottom for a basket; and a rear wall pivotally connected at the rear end of said basket structure and cooperating with said basket structure to close the rear end of the basket so formed.

2. A telescoping cart of the class described which includes: a frame having a lower structure adapted to telescopically nest within a frame of a similar cart; a supporting member at the rear of said frame; a basket structure substantially immovably connected to said supporting member and projecting forwardly therefrom, having side walls and a front wall; floor means mounted for pivotal movement with respect to said basket structure about a generally horizontal axis at its rear end, said floor means projecting forwardly from said supporting member to form a bottom for the basket formed by said basket structure and said floor means; means limiting the downward movement of the forward end of said floor means; and a rear wall pivotally connected at the rear end of said basket structure and cooperating with said basket structure to close the rear end of the basket so formed.

3. A telescoping cart of the class described which includes: a frame having a lower structure adapted to telescopically nest within a frame of a similar cart; a supporting member at the rear of said frame; a basket structure connected at its rear end to said supporting member and held against substantial movement with respect thereto, said basket structure projecting forward from said supporting member and having side walls and a front wall; floor means mounted for pivotal movement about a generally horizontal axis at its rear end, said floor means projecting forwardly from said supporting member to form a bottom for the basket formed by said basket structure and said floor means; means limiting the downward movement of the forward end of said floor means; and a rear wall pivotally mounted at the rear end of said basket structure and normally extending downwardly to close the rear end of the basket formed by said basket structure and said floor means.

4. A telescoping cart of the class described which includes: a frame having a lower structure adapted to telescopically nest within a frame of a similar cart; a supporting member at the rear of said frame; a basket structure connected at its rear end to said supporting member and held against substantial movement with respect thereto, said basket structure projecting forward from said supporting member and having side walls and a front wall; floor means mounted for pivotal movement about a generally horizontal axis located adjacent its rear end, said floor means normally closing the space between said side walls, and extending from the rear of said basket structure to the front thereof to form a bottom for the basket so provided; means limiting the downward movement of the forward end of said floor means, whereby the major portion of said floor means is normally maintained substantially horizontal; and a rear wall pivotally mounted at the rear end of said basket structure and normally extending downwardly to close the rear end of the basket formed by said basket structure and said floor means.

5. A telescoping cart of the class described which includes: a frame having a lower structure adapted to telescopically nest within a frame of a similar cart; a supporting member at the rear of said frame; a basket structure connected at its rear end to said supporting member and held against substantial movement with respect thereto, said basket structure having a stiffening member near its lower edge, with side walls projecting forwardly from said supporting member and a front wall between the forward ends of said side walls; floor means mounted for pivotal movement about a generally horizontal axis located adjacent its rear end, said floor means fitting within said basket structure to form a bottom therefor; engaging means on said floor means adapted to bear against said stiffening means of said basket structure to limit downward movement of the forward end of said floor means, whereby the major portion of said floor means is normally maintained in a substantially level position, said engaging means permitting upward movement of said forward end of said floor means; and a rear wall pivotally mounted at the rear end of said basket structure and normally extending downwardly to close the rear end of the basket formed by said basket structure and said floor means.

6. A telescoping cart of the class described which includes: a frame having a lower structure adapted to telescopically nest within a frame of a similar cart; a supporting member at the rear of said frame; a basket structure connected at its rear end to said supporting member and projecting forwardly therefrom, said basket structure having forwardly converging side walls and a front wall, the upper edges of said side walls sloping downwardly and the lower edges of said side walls sloping upwardly; floor means mounted for pivotal movement about a generally horizontal axis located adjacent its rear end, said floor means fitting within said basket structure to form a pivotal bottom therefor that may be positioned substantially wholly within said basket structure, whereby said basket structure and said floor means of one cart may be telescopically nested within the basket structure of another cart; means limiting the downward movement of the forward end of said floor means, whereby the major portion of said floor means is normally maintained substantially horizontal; and a rear wall pivotally mounted at the rear end of said basket structure and normally extending downwardly to close the rear end of the basket formed by said basket structure and said floor means.

7. A telescoping cart of the class described which includes: a frame having a lower structure adapted to telescopically nest within a frame of a similar cart; a supporting member at the rear of said frame; a generally open-work basket structure connected at its rear end to said supporting member and projecting forwardly therefrom, said basket structure having forwardly converging side walls and a front wall, the upper edges of said side walls sloping downwardly and the lower edges of said side walls sloping upwardly, said basket structure having a stiffening member near its lower edge; floor means mounted for pivotal movement about a generally horizontal axis located adjacent its rear end, said floor means fitting within said basket structure to form a pivotal bottom therefor that may be positioned substantially wholly within said basket structure, whereby said basket structure and said floor means of one cart may be telescopically nested within the basket structure of another cart; engaging means on said floor means adapted to bear against said stiffening means of said basket structure to limit downward movement of the forward end of said floor means, whereby the major portion of said floor means is normally maintained in a substantially level position, said engaging means permitting upward movement of said forward end of said floor means; and a rear wall pivotally mounted at the rear end of said basket structure and normally extending downwardly to close the rear end of the basket formed by said basket structure and said floor means.

8. A telescoping cart of the class described which includes: a frame having a lower structure adapted to telescopically nest within a frame of a similar cart; a supporting member at the rear of said frame; a generally open-work basket structure composed of longitudinally extending rod-like members connected to transversely extending vertical rod-like members to form forwardly converging side walls, said longitudinally extending members continuing across the front of said basket to form, with additional vertical members, a front wall, said basket structure being firmly connected at its rear end to said supporting member, said side walls having their upper edges sloping downwardly and their lower edges sloping upwardly; generally open-work floor means composed of longitudinally extending wire-like members connected to transversely extending wire-like members to form a floor section with upwardly extending lateral and front sides, said sides being connected to a ring frame, said floor means being mounted for pivotal movement about a generally horizontal axis located adjacent its rear end, said floor means fitting within said basket structure to form a pivoted bottom therefor that may be positioned substantially wholly within said basket structure, said ring frame being adapted to engage with one of said longitudinally extending rod-like members of said basket structure to limit downward movement of the forward end of said floor means to a position where said floor section thereof is substantially horizontal, the front end of said floor means being moved upwardly by the engagement thereof with the rear end of a generally similar cart, whereby nesting of said carts and the baskets thereof may be accomplished; and a rear wall pivotally mounted at the rear end of said basket structure and normally extending downwardly to close the rear end of the basket formed by said basket structure and said floor means.

9. A basket means for a cart of the class described which includes: a substantially rigidly mounted basket structure having forwardly converging side walls and a front wall, said side walls having their upper edges sloping downwardly and their lower edges sloping upwardly to said front wall; and floor means mounted at the lower rear end of said basket structure for pivotal movement with respect to said basket structure about a generally horizontal axis and cooperating with said basket structure to form a bottom therefor.

10. A basket means for a cart of the class described which includes: a generally open-work basket structure composed of longitudinally extending rod-like members connected to transversely extending vertical rod-like members to form forwardly converging side walls, said longitudinally extending members continuing across the front of said basket to form, with additional vertical members, a front wall, said side walls having their upper edges sloping downwardly and their lower edges sloping upwardly; and generally open-work floor means composed of longitudinally extending wire-like members connected to transversely extending wire-like members to form a floor section with upwardly extending lateral and front sides, said sides being connected to a ring frame, said floor means being mounted for pivotal movement about a generally horizontal axis located adjacent its rear end, said floor means fitting within said basket structure to form a pivoted bottom therefor that may be positioned substantially wholly within said basket structure, said ring frame being adapted to engage with one of said longitudinally extending rod-like members of said basket structure to limit downward movement of the forward end of said floor means to a position where said floor section thereof is substantially horizontal.

References Cited in the file of this patent
UNITED STATES PATENTS

| | | |
|---|---|---|
| 2,583,513 | Maslow | Jan. 22, 1952 |
| 2,596,775 | Kasper | May 13, 1952 |
| 2,639,161 | Goldman | May 19, 1953 |
| 2,644,695 | Enders | July 7, 1953 |